United States Patent [19]
Inaba

[11] Patent Number: 5,892,994
[45] Date of Patent: Apr. 6, 1999

[54] STEREO CAMERA WITH PRISM FINDER

[76] Inventor: Minoru Inaba, No. 1116, Oaza Samukawa, Oyama-shi, Tochigi-ken, Japan

[21] Appl. No.: 856,216

[22] Filed: May 14, 1997

[51] Int. Cl.⁶ .................................................. G03B 35/00
[52] U.S. Cl. ............................................................ 396/326
[58] Field of Search ................................. 396/324, 326, 396/327, 384

[56] References Cited

U.S. PATENT DOCUMENTS

| | | | |
|---|---|---|---|
| 1,596,835 | 8/1926 | Hewson | 396/326 |
| 1,871,281 | 8/1932 | Savage | 396/326 |
| 2,458,466 | 1/1949 | Campbell | 396/325 |
| 2,803,179 | 8/1957 | Donaldson | 396/326 |
| 2,834,270 | 5/1958 | Williams | 396/327 |
| 2,851,937 | 9/1958 | Ziegler et al. | 396/326 |
| 3,068,772 | 12/1962 | MacNeille | 396/141 |
| 3,115,816 | 12/1963 | Muller | 396/327 |
| 3,608,458 | 9/1971 | Ratliff, Jr. | 95/18 |
| 3,687,031 | 8/1972 | Jahnsman | 95/11 |
| 3,953,869 | 4/1976 | Wah Lo et al. | 396/327 |
| 3,967,300 | 6/1976 | Oshima | 354/288 |
| 4,040,071 | 8/1977 | Shane | 396/325 |
| 4,249,798 | 2/1981 | Moskovich | 350/423 |
| 4,418,993 | 12/1983 | Lipton | 352/57 |
| 4,462,025 | 7/1984 | Murakami et al. | 340/743 |
| 4,597,659 | 7/1986 | Suda et al. | 354/409 |
| 4,712,900 | 12/1987 | Hamano et al. | 396/133 |
| 4,879,596 | 11/1989 | Miura et al. | 358/88 |
| 5,355,253 | 10/1994 | Nanjo et al. | 396/326 X |
| 5,504,547 | 4/1996 | Mizukawa | 354/114 |
| 5,548,362 | 8/1996 | Wah Lo et al. | 396/326 |

*Primary Examiner*—Howard B. Blankenship
*Attorney, Agent, or Firm*—Fattibene & Fattibene; Paul A. Fattibene; Arthur T. Fattibene

[57] ABSTRACT

A stereo camera has an automatic collimation correcting function and excellent operability of observing right and left pictures by one finder. Right and left photographing lenses 4R and 4L are linearly obliquely moved by an inter-optical axis distance/focus adjusting mechanism, and corrected to an inter-optical distance adapted to a focal distance. A composite prism 5 for synthesizing one picture by inverting the outer one-half portions of the photographing fields of the right and left photographing lenses is interlocked to the focal adjustment by a prism moving cam 16 to be moved back and forth, and the focal distance point on the central extension line of the stereo camera is disposed at the center between the right and left finder pictures irrespective of the inter-optical axes distance. The lateral width of the subject image is changed in response to a focal adjustment, and an accurate focus can be adjusted by varying the shape of the image.

11 Claims, 21 Drawing Sheets

FIG. 4a
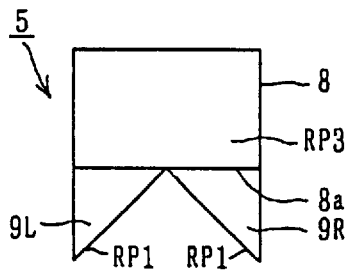
FIG. 4e
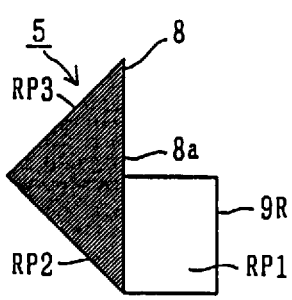
FIG. 4b
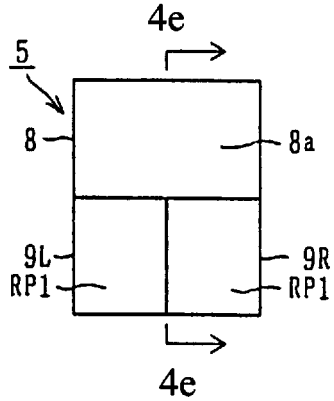
FIG. 4f
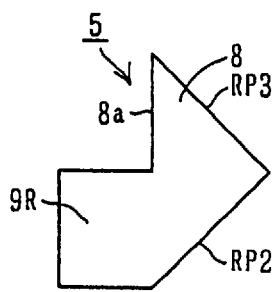
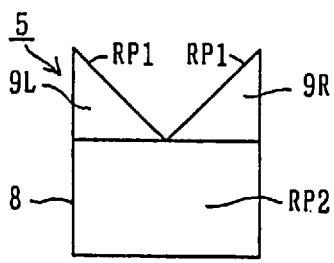
FIG. 4c
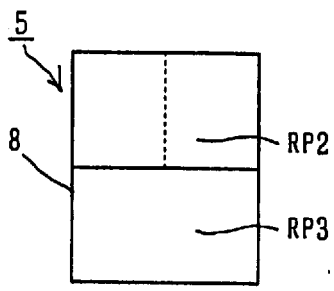
FIG. 4d FIG. 10a
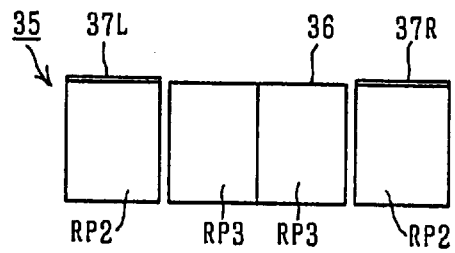
FIG. 10e
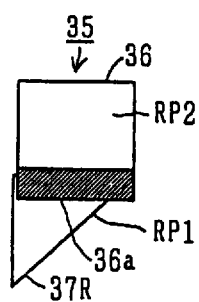
FIG. 10b
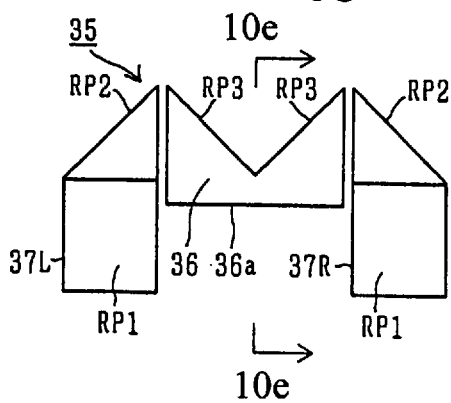
FIG. 10f
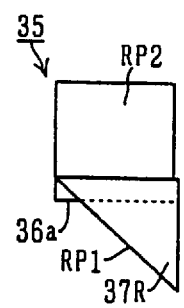
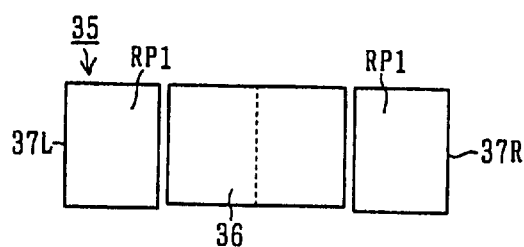
FIG. 10c
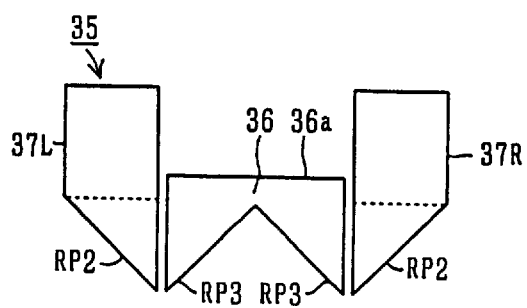
FIG. 10d FIG. 16a
FIG. 16b
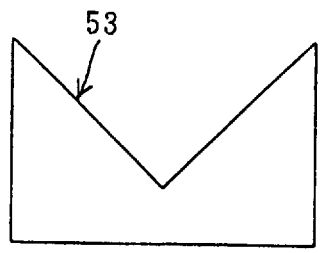
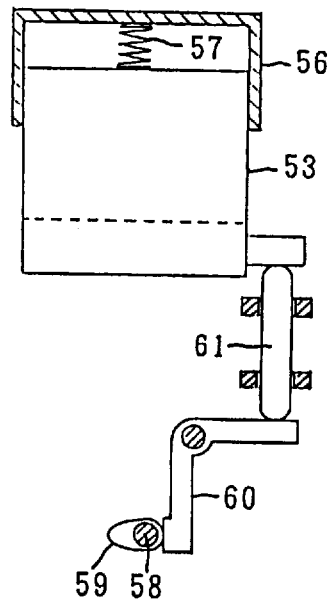

STEREO CAMERA WITH PRISM FINDER

BACKGROUND OF THE INVENTION

1. Field of the Invention

The present invention relates to a stereo camera and, particularly, to a stereo camera having a prism finder for synthesizing one picture by the one-half portions of photographing pictures of right and left lenses.

2. Description of the Prior Art

There are as a stereo camera having two photographing lenses aligned in parallel in one camera body, a reflex-type stereo camera which views the pictures of right and left photographing lenses separately by right and left pentaprisms and a rangefinder type stereo camera which views a photographing field by one range-finder type finder or a real image type finder.

The reflex-type stereo camera has an advantage that a user can view the actual photographing picture through photographing lenses, but the structure that the two finders are simultaneously viewed by two eyes is difficult to have easy operability from the structure that one finder is viewed by a single eye. Particularly, it is difficult to simultaneously view the two finders in a stereo camera in which the pitch between right and left finders exceeds a distance (about 63.5 mm is known) between two human eyes from being limited by the outer diameter of the lens and the size of the lens-mounting mechanism.

In the conventional stereo camera that the distance between the right and left lenses is fixed, non-overlapping areas are generated at the outside of the right and left pictures due to the difference of the photographing fields of the right and left lenses. There are disadvantages that the loss of the picture is large since it is necessary to mask the non-overlapping areas which do not obtain stereo effect at the time of mounting.

Accordingly, the inventor of the present invention has proposed a stereo camera in which a composite prism is provided to synthesize one picture by introducing the outer one-half portions (inner one-half portions of a film exposing surface) of the photographing fields of right and left photographing lenses, enabling the synthesized picture to be observed through one finder, wherein a mechanism for adjusting the distance between the optical axes of the lenses interlocked to a focal point adjusting mechanism is provided, so that the photographing fields of the right and left lenses at a focal distance are brought into agreement with each other at all times to suppress the loss of the picture (Japanese Patent Application No. 8-053476).

Since this stereo camera brings the photographing fields of the right and left lenses at the focal distance, the focal point can be adjusted while observing the sideward deviation of the image of the right and left one-half portions of the finder picture synthesized by the one-half portions of the right and left photographing fields, and there are no deviation of subject image of the right and left one-half areas of the finder picture. When the right and left one-half portions of the finder picture become one normal image, the subject is focused.

Referring to FIG. 19(a), a circular subject is shown, and referring to FIGS. 19(b), 19(c) and 19(d), the finder images of the stereo camera are shown. When the subject of FIG. 19(a) is positioned at the center of the finder picture, the subject that is in focus appears in a real shape as shown in FIG. 19(b). The subject that is farther than the focal point, appears being broadened as shown in FIG. 19(c). The subject that is nearer than the focal distance, appears being narrowed as shown in FIG. 19(d). The focal point can be adjusted while observing the sideward deviation of the finder image of the right and left one-half portions of the finder image.

However, there exists not almost the state that all the subject in the pictures are disposed at the focal distance in fact, and the subjects are frequently mixed at various distances. When the certain subject is focused, the subject of the closer distance in the same picture is photographed in the state that the inter-optical axis distance correcting amounts of the lenses might become insufficient with respect to the close range subject in the same pictures. Since the human visual senses have collimation for noting a close range subject, a stereo slide that the subjects of various distances are mixed is appreciated by a viewer, the close range subject is focused at the extremely close range to be observed unnaturally. In order to correct it, at the time of mounting, it is necessary to suitably mask the outer areas of the right and left pictures.

Therefore, in the case of photographing at a close distance or the case except the photographing at the close distance that other subject does not exist between the main subject and the lenses, it might effectively suppress the loss of the picture the stereo camera is so constituted that the ranges of the photographing fields of the right and left lenses are brought into agreement at the closer distance than the focal distance.

In FIG. 20, an exponential curve A shown by a broken line shows the inter-optical axis distance/focal point adjusting focuses of the principal point of the right and left lenses that the ranges of the photographing fields of the right and left lenses are brought into agreement at a focal distance at all times. The exponential curve A of the conditions that the focal distance of the lenses is 36 mm and the pitch between the right and left exposure surfaces is 66 mm is shown in FIG. 21.

Let it new be presumed that a piece of thin lens is employed and that:

Focal distance of the lens - - - f

Distance from the subject to the principal point of the lens - - - L

Distance from the focal point of the lens to the image-forming position - - - $\Delta if$.

Then, there holds $\Delta if = f^2/(L-f)$ and, hence, the distance between the principal point of the lens to the surface of the film becomes $f + \Delta if$.

Moreover, if the pitch between the right and left exposing surfaces of the stereo camera is $P_1$, the shifting amount $S1$ of the right and left lenses for bringing the right and left photographing ranges into agreement s given by.

$$S1 = (P_1/2) \times (f + \Delta if)/(L + f + \Delta if).$$

That is, the right and left lenses may be moved in a direction to approach each other by a shifting amount $S1$ calculated from the above equation with a decrease in the distance L from the subject to the principal point of the lenses. The exponential curve A is the locus based on the above equation.

Referring to FIG. 21, a solid line B is a straight line for connecting the point of shifting the right and left lenses from the exponential curve A to the inside at an infinite remote focal position $F_I$ to the point of bringing the photographing fields of the right and left lenses into agreement with each other at the shortest distance focal position $F_S$, and except the shortest distance focal position $F_S$, the photographing fields of the right and left lenses are brought into agreement at the close range from the focal distance. When it is so constituted that the right and left lenses are moved along the line segment of more inner shifting amounts in the entire area of the solid line B or the focal point adjusting range, the remote or close distance feeling adapted to the real photographing state that other subject exists at close distance from the subject of the focal distance is obtained.

However, when the stereo camera for synthesizing the one finder picture by the outer one-half portions of the above-mentioned right and left photographing pictures mounts the linearly moving type inter-optical axis distance and focus adjusting mechanism, the right and left lenses are shifted further inside from the position that the ranges of the photographing fields are brought into agreement at the shortest distance focal position $F_S$ (in the case of the solid line) or all focal point range (in the case of more line segments of the inner shifting amount from the solid line B). Accordingly, the subject image at the focal distance is observed to be broadened as shown in FIG. 19(c) even if the subject image is focused. Therefore, it has a disadvantage that focusing at the subject while observing the deviation of the finder image becomes impossible.

It therefore becomes necessary to solve the above-mentioned technical problem, so that the right and left focal photographing pictures can be viewed through one finder, and to provide a stereo camera having inter-optical axis distance/focus adjusting mechanism of inter-optical axis distance correcting amount adapted to the real photographing condition and enabling to accurately adjust the focus by the finder image. The object of the present invention therefore is to solve the above-mentioned technical problem.

SUMMARY OF THE INVENTION

In order to accomplish the above-mentioned object, the present invention provides a stereo camera comprising two optical systems of a single-lens reflex camera disposed in parallel in one camera body each including a prism type finder for synthesizing one picture by the outer one-half portions of the photographing fields of right and left photographing lenses, an inter-optical axis distance/focus adjusting mechanism for obliquely moving the right and left photographing lenses along a line for connecting an infinite remote focal position to a shortest distance focal position reduced at an inter-optical axis distance to automatically correct a collimation, wherein said prism is slidably mounted in a direction for approaching and separating the right and left one-half portions of the finder image through a prism moving mechanism, an interlocking mechanism for interlocking said prism moving mechanism to the inter-optical axis distance/focus adjusting mechanism, so that said inter-optical axis distance/focus adjusting mechanism is so constituted that a focal distance point on a line in parallel with two right and left optical axes is positioned at the center of right and left pictures of the prism finders at all times through the intermediate of the optical axes of the right and left photographing lenses.

The invention further provides a stereo camera wherein said prism type finder is constituted by a plurality of prisms or a combination of a prism and a mirror, so that the prism or the mirror for synthesizing the right and left one-half pictures to one picture is mounted slidably in a direction for approaching and separating the right and left one-half portions of the finder image through said prism moving mechanism.

BRIEF DESCRIPTION OF THE DRAWINGS

FIG. 4 shows a prism of FIG. 3, wherein FIG. 4(a) is a plan view, FIG. 4(b) is a front view, FIG. 4(c) is a bottom view, FIG. 4(d) is a back view, FIG. 4(e) is a view along the line A—A, and FIG. 4(f) is a side view;

FIG. 10 shows the prism unit of FIG. 9, wherein FIG. 10(a) is a back view, FIG. 10(b) is a plan view, FIG. 10(c) is a front view, FIG. 10(d) is a bottom view, FIG. 10(e) is a view along the line A—A of FIG. 10(b), and FIG. 10(f) is a side view;

FIG. 15 illustrates the prism unit of FIG. 14, wherein

FIG. 16(a) is a front view of the central prism of FIG. 14, and FIG. 16(b) is a side sectional view of a slide mechanism of the central prism;

DESCRIPTION OF THE PREFERRED EMBODIMENTS

Figure 1:
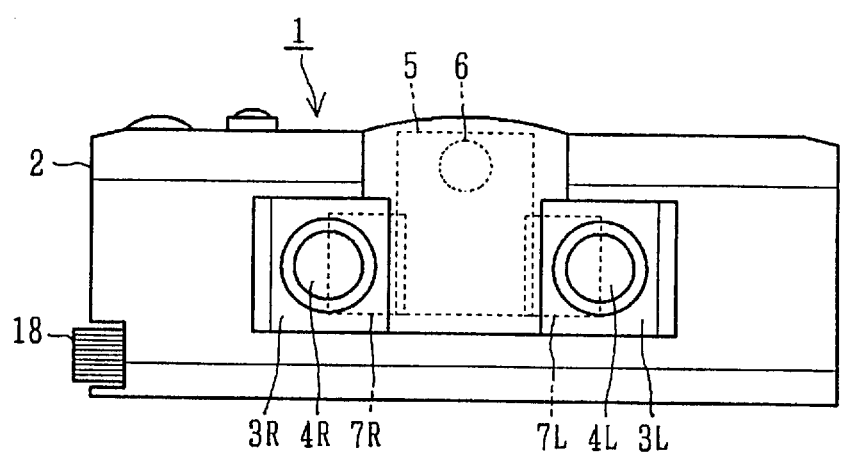
FIG. 1 is a front view of a stereo camera, illustrating one embodiment of the present invention of claim 1.
Figure 2:
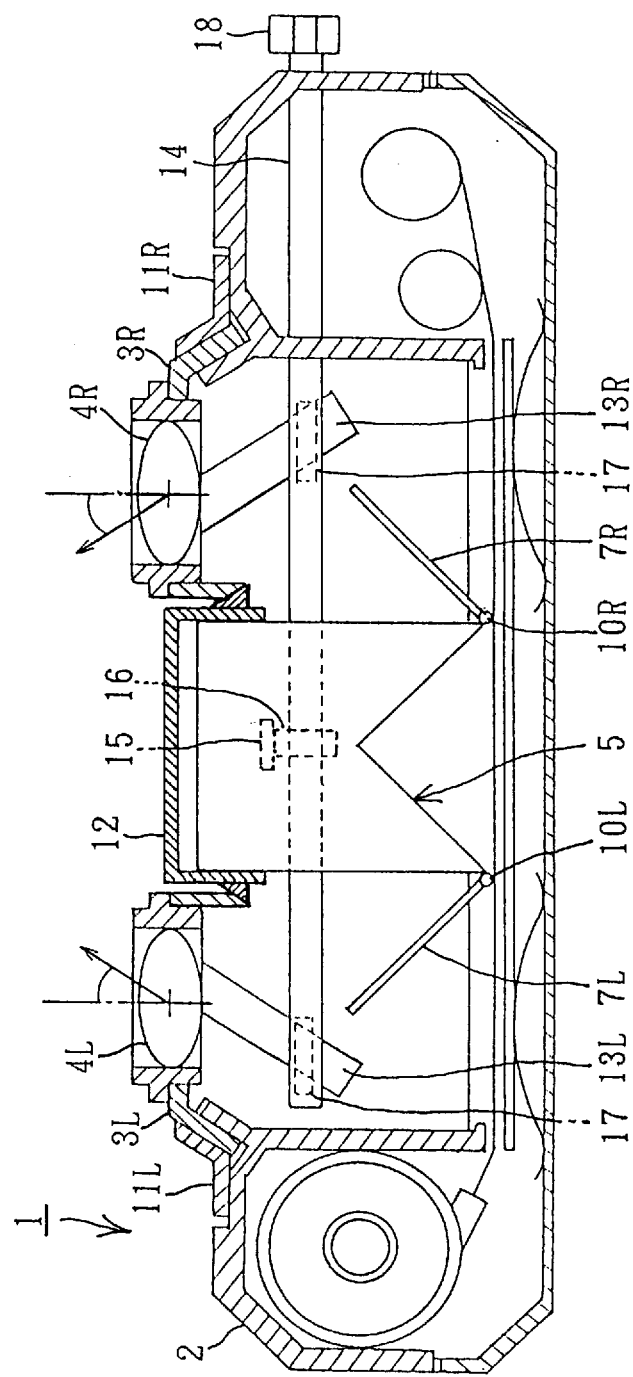
FIG. 2 is a sectional view of the stereo camera of FIG. 1.

Embodiments of the present invention will now be described in detail. FIGS. 1 and 2 illustrate a stereo camera 1, wherein photographing lenses 4R and 4L are arranged at right and left lens boards 3R and 3L of the front surface of a camera body 2, and a prism 5 is positioned at the center between the right and left of the camera body 2. A finder mechanism includes an eyepiece 6, the prism 5 and vertical type reflex mirrors 7R and 7L disposed at the right and left of the prism 5.

Figure 3:
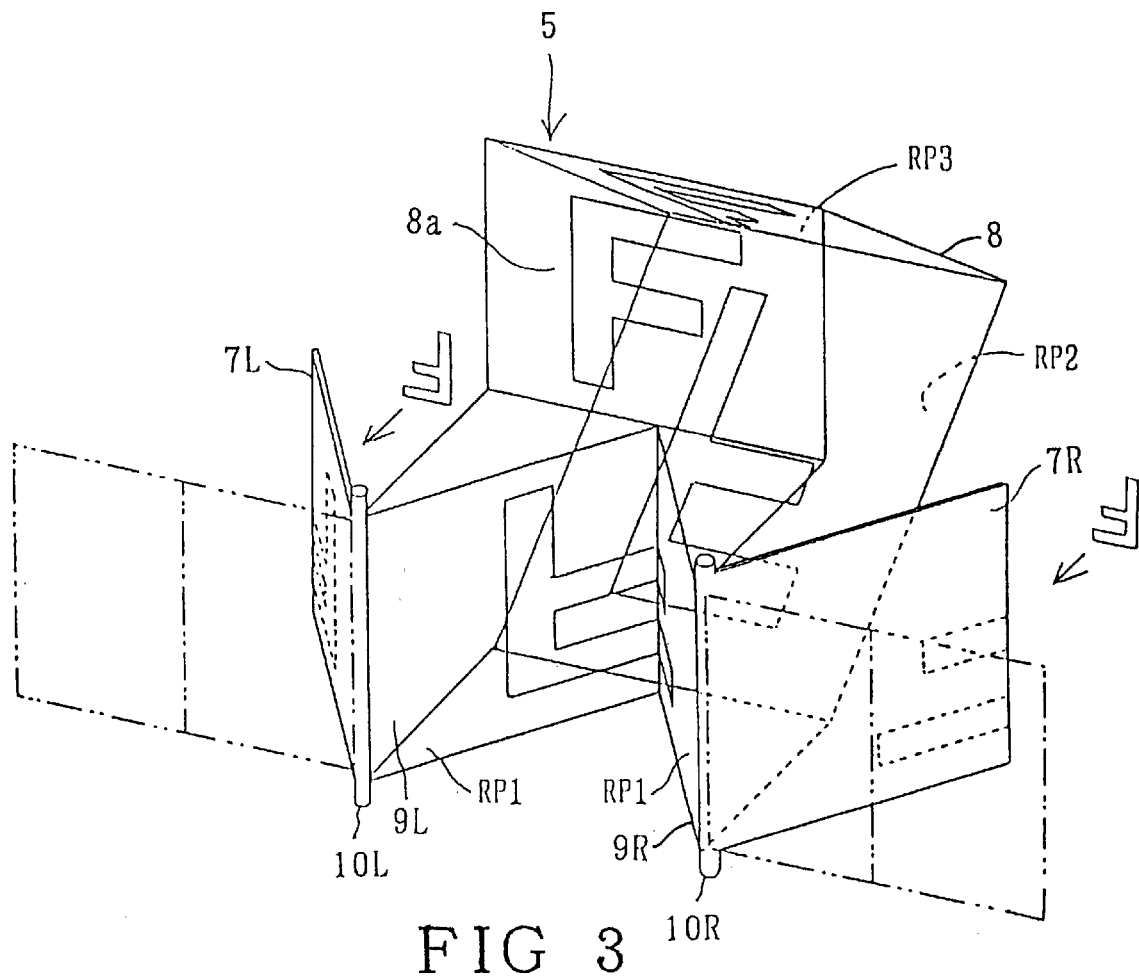
FIG. 3 is a perspective view of the stereo camera of FIG. 1.

Referring to FIGS. 3 and 4, the prism 5 is made of an optical resin or an optical glass by integral molding. Sideward 90-degree reflection prism units 9R and 9L are joined to the right and left one-half portions of the lower planes of incidence of 180-degree reflection prism units 8 for displacing the light paths of incident lights and reflected lights in parallel in upper or lower direction. The vertical planes directed in outer sideward direction of the 90-degree reflection prism units 9R and 9L are planes of incidence, and the entire width of the prism 5 is the same as or slightly broadened from the width of the exposing picture of the stereo camera 1.

Referring to FIG. 2, the reflex mirrors 7R and 7L disposed at the right and left of the prism 5 rotate in a horizontal direction at pivots 10R and 10L at the centers of rotation. At the time of taking a photograph, the reflex mirrors 7R and 7L rotate in the direction sideward of the prism 5 from the 45-degree standby position with respect to the optical axis, and retreats from the light path between the lenses 4R and 4L and the film surface.

Referring to FIG. 3, when the reflex mirrors 7R and 7L are disposed at the standby positions, the pictures of the outer one-half portions (inner one-half portions of the exposing surfaces) of the photographing ranges of the right and left lenses are inverted left side right by the reflex mirrors 7R and 7L, and incident to the 90-degree reflection prism units 9R and 9L of the prism 5. The pictures are totally reflected three times by the reflecting surfaces RP1 of the 90-degree reflection prism units 9R and 9L and the reflecting surfaces RP2 and RP3 of the 180-degree reflecting prism unit 8, and an aerial image synthesized by the erect image of the outer one-half portion of the photographing ranges of the left lens and the erect image of the outer one-half portion of the photographing ranges of the right lens at the upper plane of projection 8a of the 180-degree reflection prism unit 8. When the planes of incidence of the 90-degree reflection prism units 9R and 9L of the prism 5 are matted to focal surfaces, the focus can be adjusted by observing the focused real images of the focal surfaces.

Figure 21:
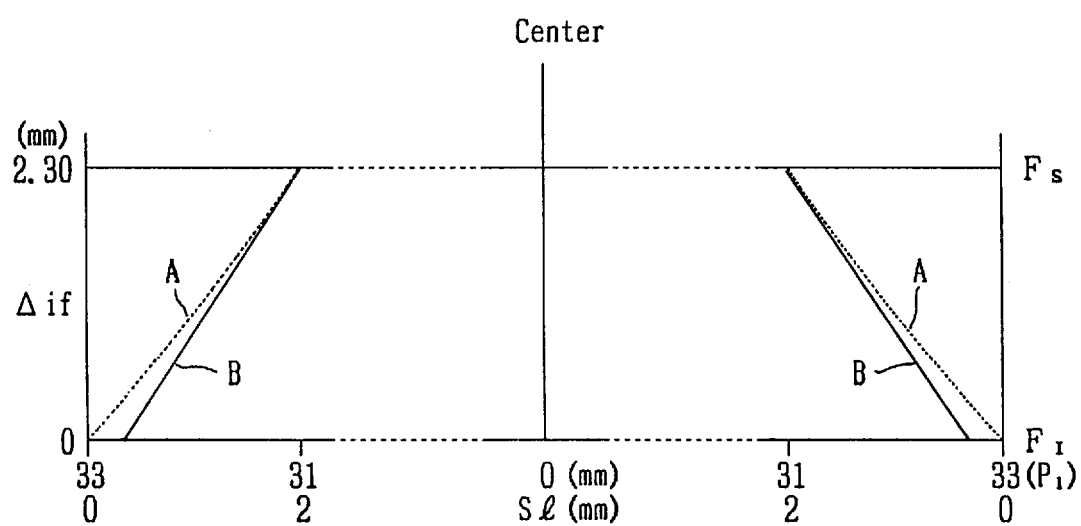
FIG. 21 is an explanatory graph showing the loci of principal points of the right and left lenses, wherein A shows an exponential curve locus that the ranges of photographing fields of the right and left lenses into agreement at a focal distance at all times, and B shows a solid line locus of many shifting amounts.

Referring to FIG. 2, the prism 5 and the right and left lens boards 3R and 3L are engaged with obliquely moving type slide guides 11R and 11L formed on the front surface of the camera body 2. The prism 5 is mounted at the central slide guide 12 to linearly move back and forth, and the slide guides 11R and 11R of the lens boards 3R and 3L are so formed in shape that the loci of the principal points of the photographing lenses 4R and 4L become solid line B as shown in FIG. 21.

Guide arms 13R and 13L extended rearward from the right and left lens boards 3R and 3L are engaged with a cam shaft 14 disposed in a rightward or leftward direction in the camera body 2. The prism 5 is energized rearward by a spring (not shown) to urge the guide arm 15 mounted at the bottom of the prism 5 to the prism moving cam 16 of the cam shaft 14.

Figure 5:
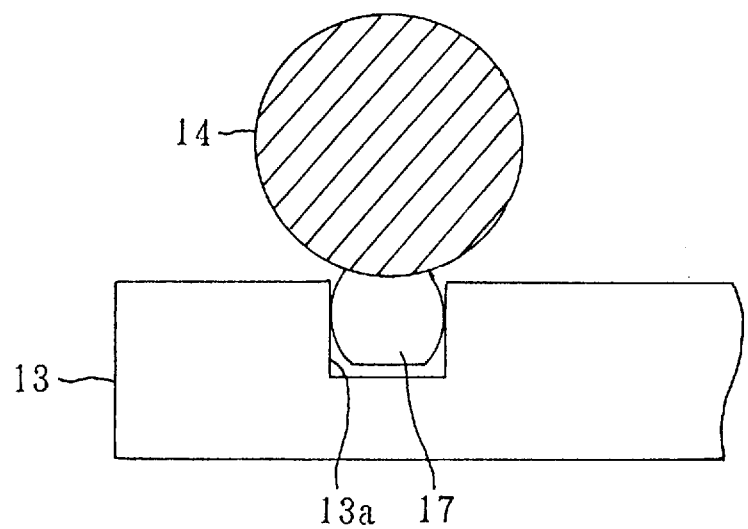
FIG. 5 is a sectional view of a lens moving cam mechanism of the stereo camera of FIG. 1.

Referring to FIG. 5, the guide arm 13 and the cam shaft 14 of the lens boards are illustrated. The involute cam 17 of the cam shaft 14 is engaged with the rectangular sectional groove 13a molded on the guide arm 13, the clearance between the involute cam 16 and the rectangular sectional groove 13a is formed as small as possible to eliminate its backlash, and hence accurate focus adjustment is performed.

A knob 18 provided at one end of the cam shaft 14 shown in FIG. 2 is rotated by fingers, the right and left lens boards 3R and 3L obliquely moves back and forth, advances in the approaching direction, or retreats in the separating direction. The prism 5 moves back and forth in response to the rotation of the cam shaft 14 similar to the lens boards 3R and 3L.

The cam mechanism of the prism 5 is so constituted that the point of a focal distance on a line parallel to the optical axes of right and left photographing lenses 4R and 4L is disposed at the center between the right and left pictures of the finder through the center of the right and left of the prism 5 at all the positions on the solid line locus B of the principal point of the lens shown in FIG. 21 at all times so that when the prism 5 moves back and forth in synchronization with the direction of the focus at a close distance, the prism 5 is also interlocked and advanced.

Though omitted in the drawings, the lens boards and the cam mechanism of the prism of various shape may be applied, and the shape is not limited.

Figure 6:
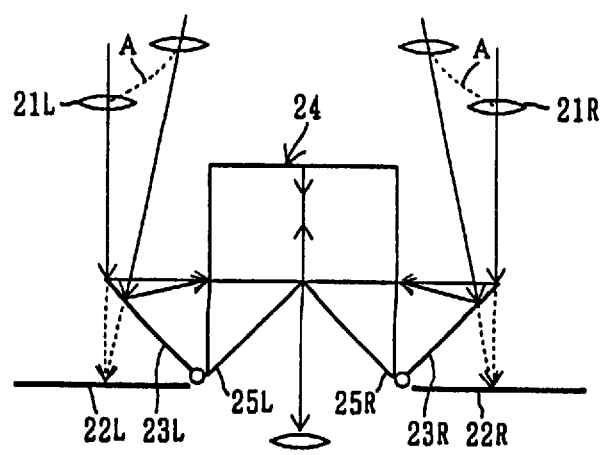
FIG. 6 shows a conventional example, and is an explanatory view illustrating a relationship between a fixed prism and a finder picture.

Then, a relationship between the position of the prism 5 and the finder picture will be described. FIG. 6 shows an explanatory view of a conventional prism fixed type stereo camera, and FIG. 7 shows an explanatory view of the stereo camera of the present invention.

As shown in FIG. 6, the image of the subject on an extension line passing the center between the right and left of the stereo camera is directed toward the center between the right and left exposing surfaces 22R and 22L through right and left photographing lenses 21R and 21L, turned in the direction by reflex mirrors 23R and 23L, and introduced to the plane of incidence of the side of a prism 24. The prism 24 is disposed at a position where the vertexes of the centers of intersecting right and left 90-degree reflection prism units 25R and 25L bring into agreement with the center of the right and left pictures. The photographing lenses 21R and 21L move according to an exponential curve A that the ranges of fields of right and left photographing are brought into agreement at all times in a focus adjusting range shown in FIG. 20. Accordingly, the positions of the photographing lenses 21R and 21L are positioned at the same position on the right and left pictures of the subject at a focal distance in the entire range of the infinite remote position from the shortest photographing position, and as shown in FIG. 19, the focus is adjusted by observing the positional deviation of the finder image.

Figure 7:
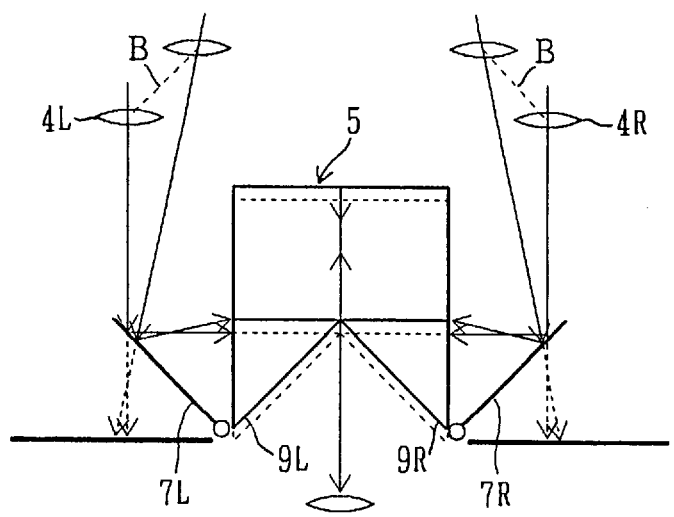
FIG. 7 is an explanatory view illustrating a relationship between a slide type prism of FIG. 3 and a finder picture.
Figure 19A:
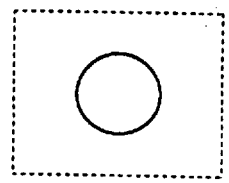
FIG. 19(a) is a subject.
Figure 19B:
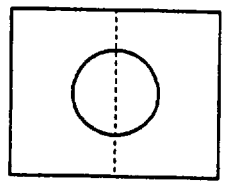
FIGS. 19(b), 19(c) and 19(d) are explanatory views showing the finder picture of the stereo camera having an inter-optical axis distance/focus adjusting mechanism.
Figure 19C:
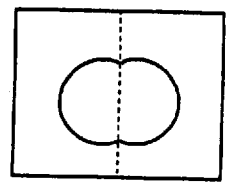
Figure 19D:
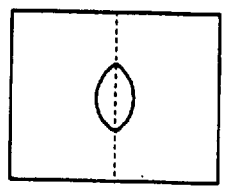
Figure 20:
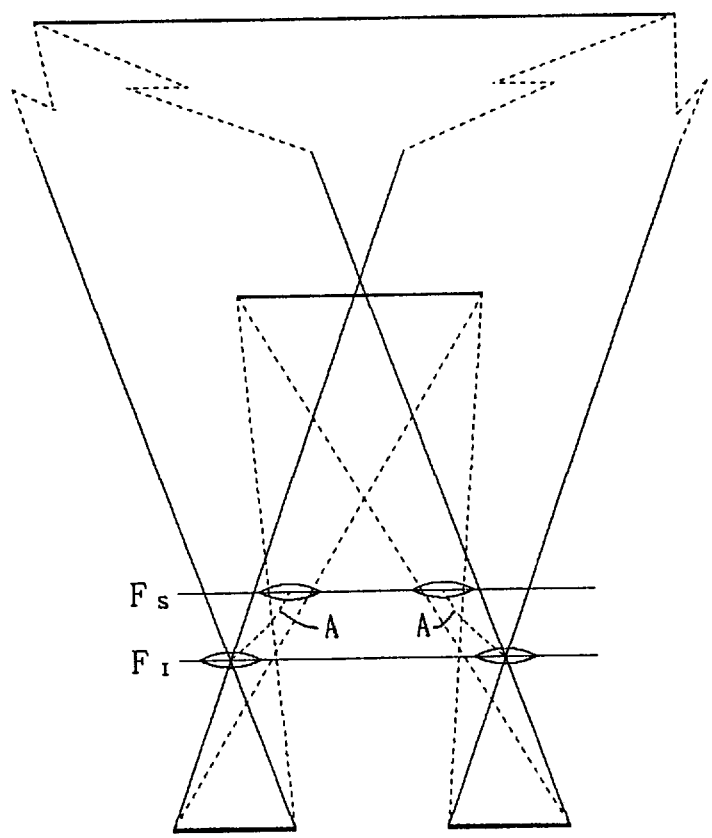
FIG. 20 is an explanatory view showing the inter-optical axis distance/focus adjusting mechanism for bringing the range of photographing fields of right and left lenses of the stereo camera into agreement at all times.

On the other hand, since the photographing lenses 4R and 4L of the stereo camera 1 of the present invention linearly obliquely moved, when moving on a solid line B as shown in FIG. 7, the subject of a focal position is shifted to the inside on the exposing surface at the position except the shortest photographing distance. Accordingly, the light from the subject at an infinite remote distance is passed in parallel with the optical axis at the center of the photographing lenses 4R and 4L in the state that the infinite remote distance is focused as shown in FIG. 7, and the light reflected by the reflex mirrors 7R and 7L and incident to the prism 5 is displaced rearward (downward in FIG. 7) from the case that it is focused at a close distance as indicated by a solid line, but the prism 5 is retracted by interlocking to the photographing lenses 4R and 4L by the cam mechanism. The cam mechanism retracts the prism 5 equally to the rear displacement amount of the light path. The image of the focal distance point on the extension line passing the center of the stereo camera is brought into agreement with the vertexes of the centers intersecting the right and left 90-degree reflection prism units 9R and 9R respective of the feeding amount of the lenses, and as shown in FIG. 19(b), it is observed as a complete one picture, and the focus can be adjusted by observing the positional deviation of the finder image similarly to the conventional type stereo camera.

Figure 8:
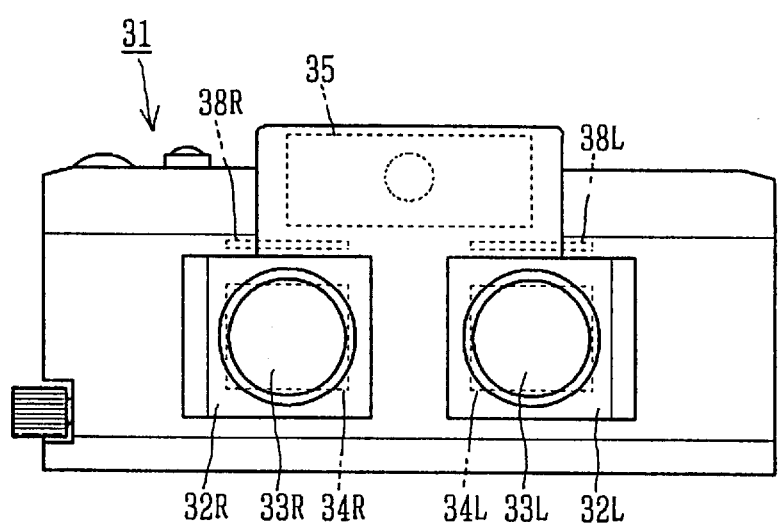
FIG. 8 illustrates another embodiment of the invention of claim 2, and is a front view of a stereo camera.

Referring to FIG. 8, still another embodiment of a stereo camera of the present invention will be illustrated. An inter-optical axis distance/focus adjusting mechanism of this stereo camera 31 has the same constitution as that of the stereo camera 1 of FIG. 2, and lens boards 32R and 32R and photographing lenses 33R and 33L are obliquely moved along a solid line B. HOwever, similarly to a general single-lens reflex camera, it has a constitution that a rear portion is used as a fulcrum to rotate in upward or downward direction, and the light reflected above the right and left reflex mirrors 34R and 34L is incident to a prism unit 35 in a camera body.

Figure 9:
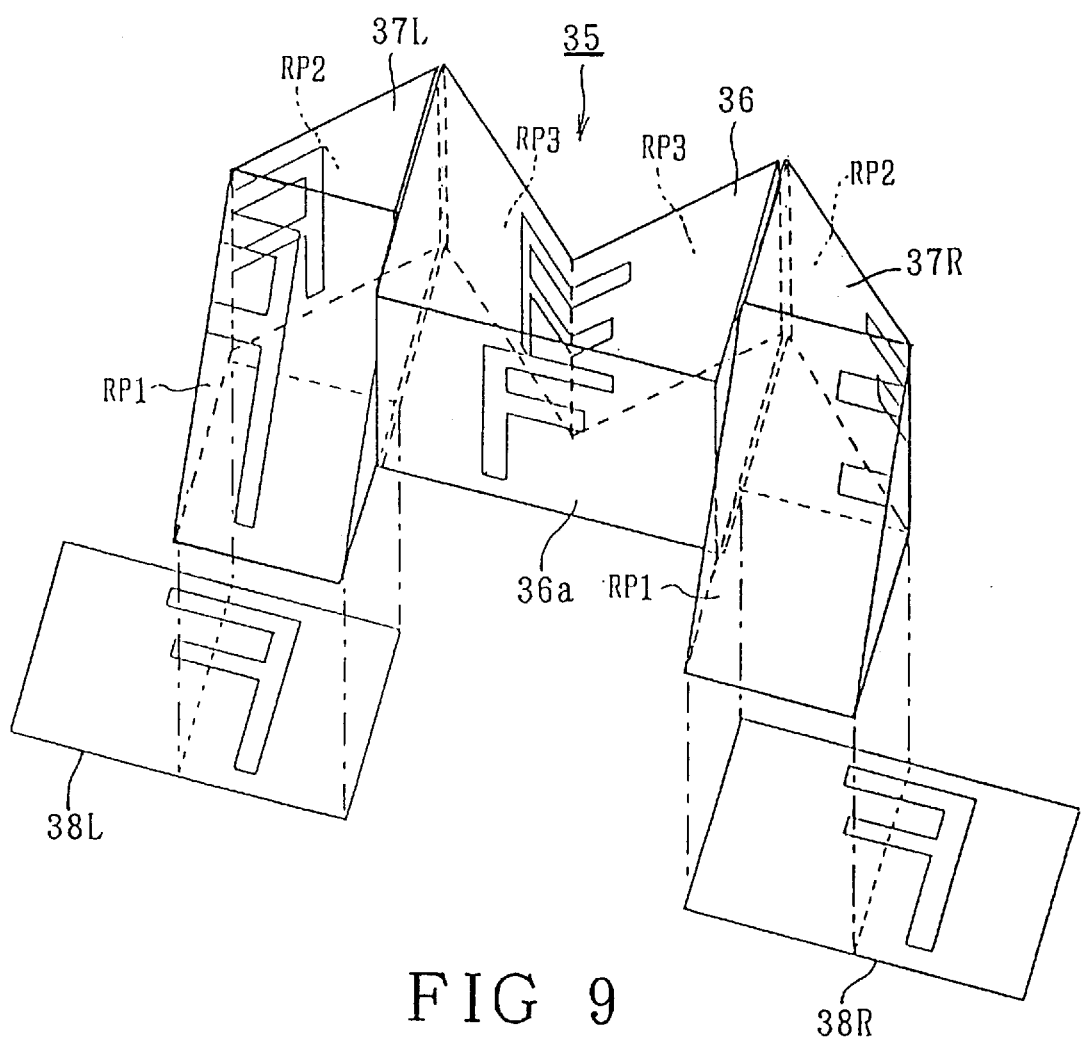
FIG. 9 is a perspective view of a prism unit of the stereo camera of FIG. 8.

Referring to FIGS. 9 and 10, the prism unit 35 has three prisms 36, 37R and 37L, and the central prism 36 is in a shape that two 90-degree reflection prisms are jointed in a planar M shape to move back and forth by a slide mechanism to be described later. The prisms 37R and 37L disposed at the right and left of the central prism 36 are disposed symmetrical in shape that the two 90-degree prism units are rotated at 90 degrees from each other. The total width of the prism units 35 is the same as or slightly wider than the pitch of the right and left exposing surfaces of the stereo camera 31, and the total width of the central prism 36 is also the same as or slightly wider than the width of the one picture.

The right and left prisms 37R and 37L are disposed in planes of incidence of lower surfaces thereof on the right and left focal plates 38R and 38L toward the inner one-half regions of the focal plates 35R and 38L to turn the light incident through the focal plates 38R and 38L toward the center and to introduce the light to the side of the central prism 36. As shown in FIG. 9, the light rays incident from the lower direction to the right and left prisms 37R and 37L are reflected three times, and projected horizontally rearward from the plane of projection 35a of the central prism 36 (in the direction of this side of this sheet in FIG. 9). The lower surfaces of the right and left prisms 37R and 37L are made in the form of a ground glass of focal plane, and focal plates 38R and 38L may be omitted.

The upside down and right side left inverted images that have passed through the photographing lenses 33R and 33R are inverted upside down by the reflex mirrors 34R and 34L, and erect right side left inverted images are formed on the focal plates 38R and 48L. Images of the inner one-half portions of the right and left focal plates 33R and 33L are symmetrically inverted right side left, i.e., the outer onehalf portions of the photographing ranges of the right and left photographing lenses 33R and 33R are symmetrically inverted right side left by the prism 36. Therefore, the erect image of the outer one-half portion in the photographing range of the left photographing lens 33L is projected onto the left one-half portion of the projection plane 36a of the central prism 36, and the erect image of the outer one-half portion in the photographing range of the right lens 33R is projected onto the right one-half portion of the projection plane 36a thereby to synthesize a picture.

Figure 11A:
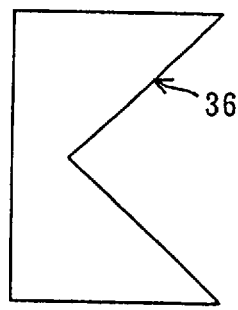
FIG. 11(a) is a plan view of a central prism of FIG. 9.
Figure 11B:
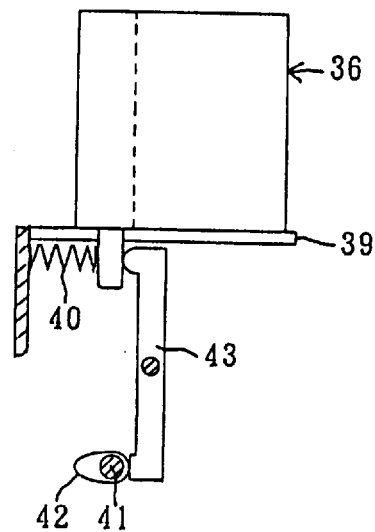
FIG. 11(b) is a side sectional view of a slide mechanism of the central prism.

Referring to FIG. 11, a slide mechanism of the central prism 36 is shown. The central prism 36 is mounted at a slide guide 39, and urged forward by a compression spring 40. A prism moving cam 42 is provided coaxially with the same focus/inter-optical axis distance adjusting cam (not shown) as that of the stereo camera 1 shown in FIG. 2 is provided at the cam shaft 41, and the prism moving cam 42 is coupled to the central prism 36 via a lever 43.

Figure 12:
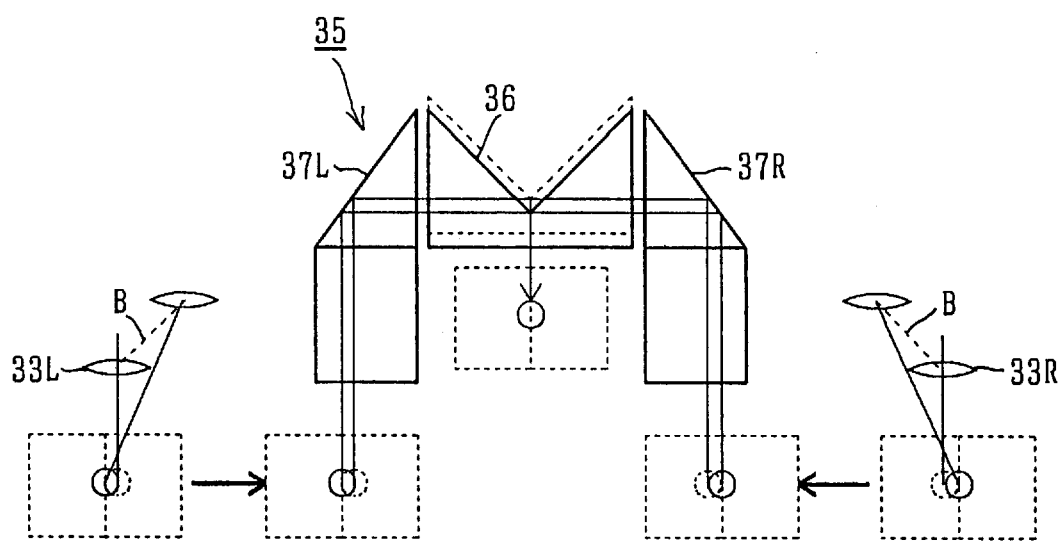
FIG. 12 is an explanatory view for explaining a relationship between the prism unit of FIG. 8 and the finder picture.

The central prism 36 is moved in the reverse direction to the back and forth movement of the photographing lens by the rotating operation of a knob of an inter-optical axis distance/focus adjusting mechanism reversely to the stereo camera 1 shown in FIG. 2, and as shown in FIG. 12, the image of the subject at a focal distance on the extension line passing the center of the stereo camera is brought into agreement with the vertex of the center intersecting the right and left 90-degree reflecting prism units of the central prism 36 respective of the positions of the photographing lenses 33R and 33L, and as shown in FIG. 19(b), it is observed as a complete one picture, and the focus can be adjusted due to the positional deviation of the finder image.

Figure 13:
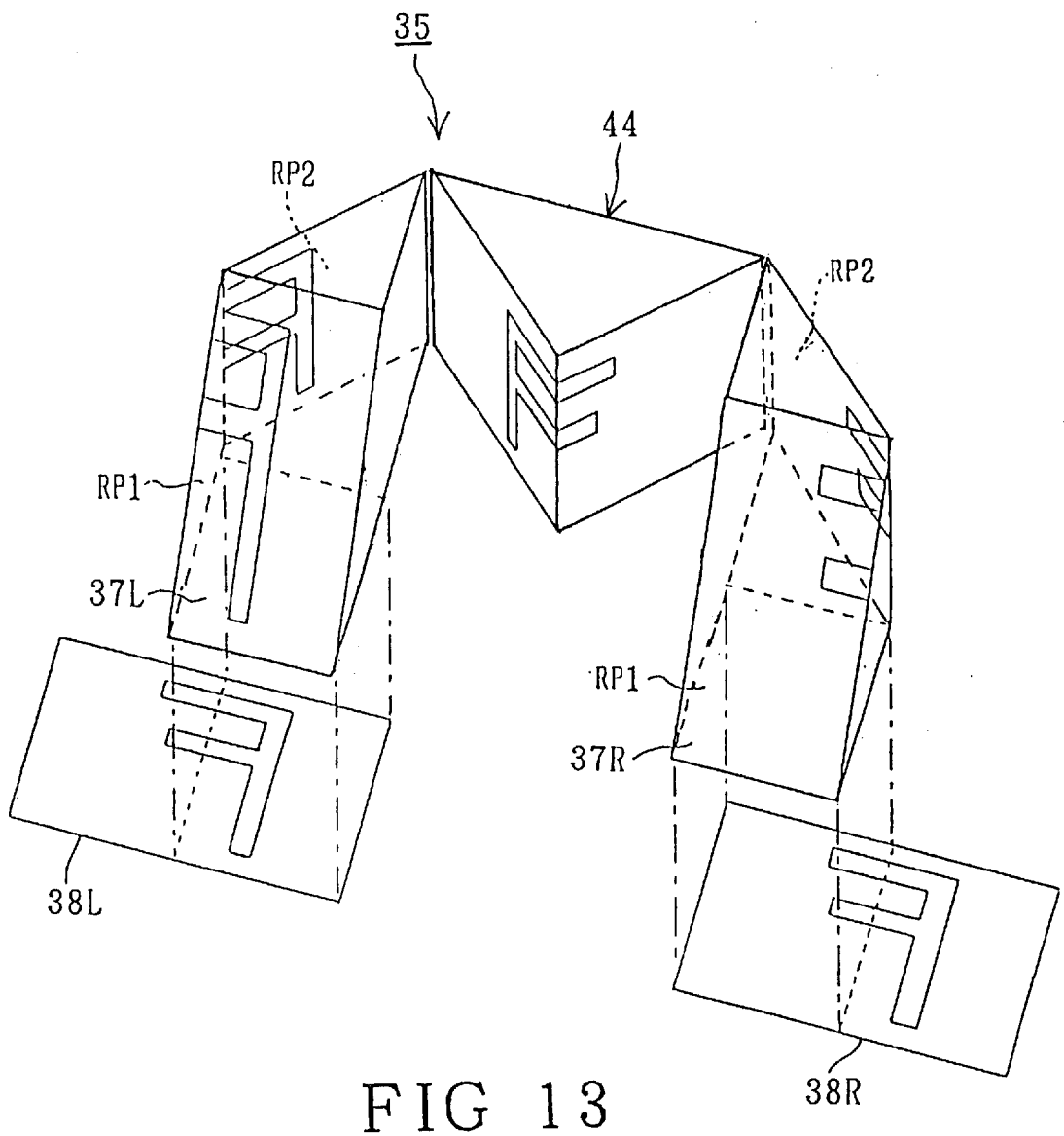
FIG. 13 is a perspective view illustrating still another embodiment of a prism unit.

Referring to FIG. 13, still another embodiment of the prism unit shown in FIG. 9 is shown. A triangular mirror 44 having the same operation as the central prism is disposed instead of the central prism 36. The mirror 44 is moved by a slide mechanism interlocked to the inter-optical axis distance/focus adjusting mechanism shown in FIG. 11, and the focus is adjusted due to the positional deviation of the finder image similarly to that shown in FIG. 12.

Figure 14:
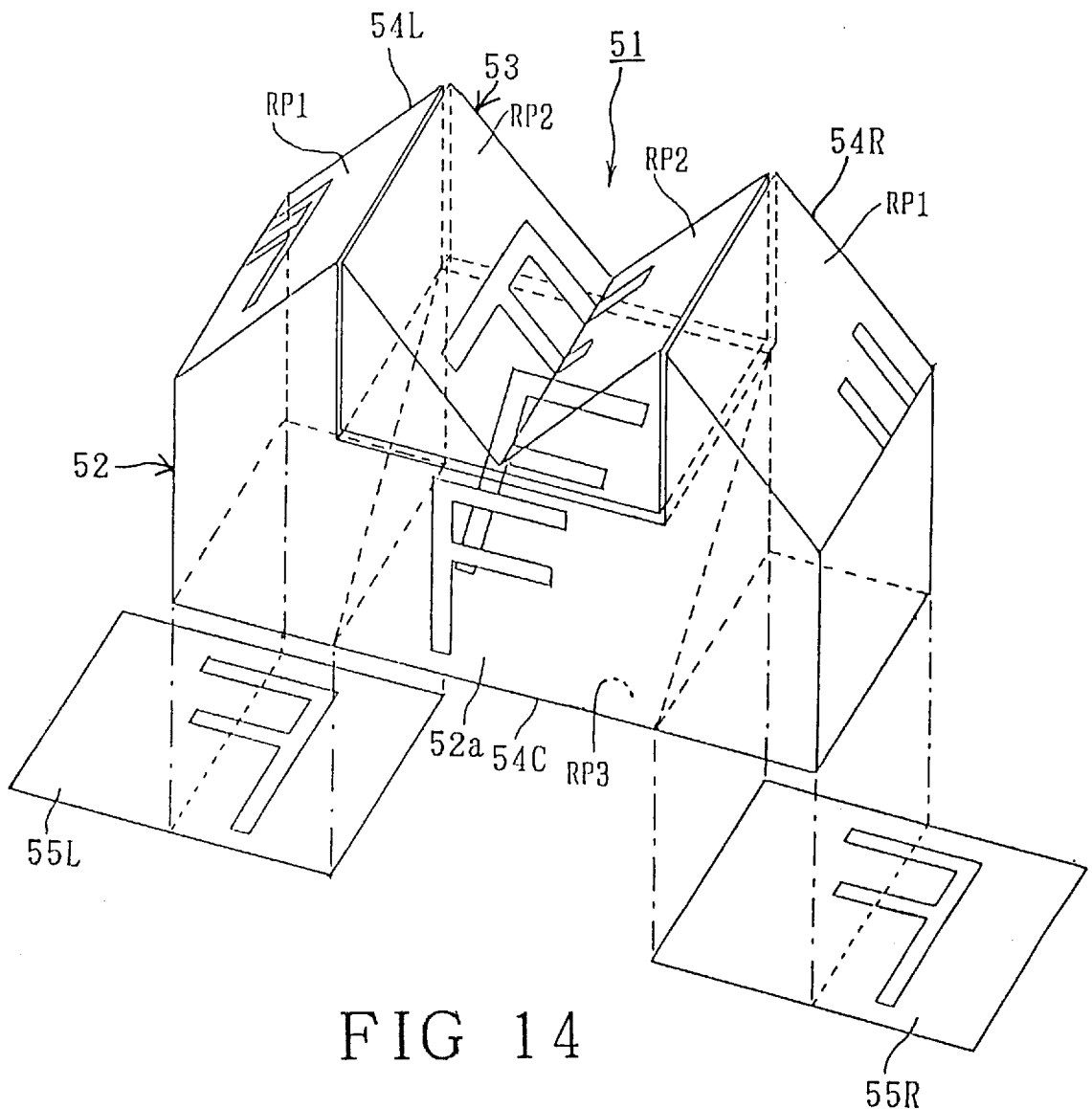
FIG. 14 is a perspective view illustrating still another embodiment of the prism unit.
Figure 15A:
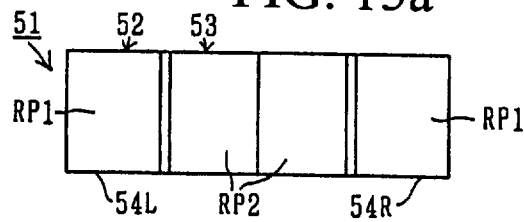
FIG. 15(a) is a plan view.
Figure 15E:
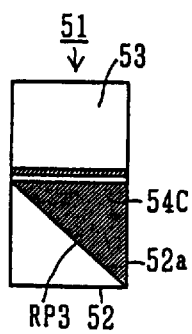
FIG. 15(e) is a view along the line A—A of FIG. 15(b)
Figure 15B:
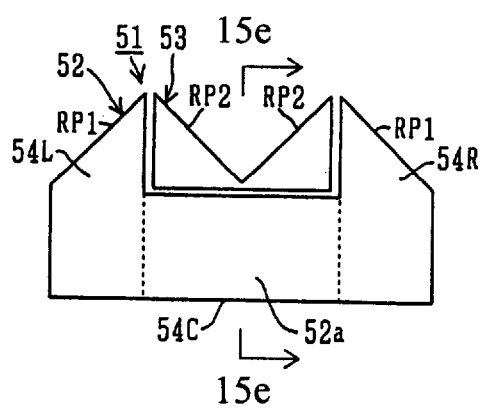
FIG. 15(b) is a front view.
Figure 15F:
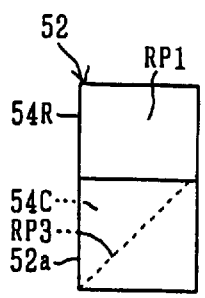
FIG. 15(f) is a side view.
Figure 15C:
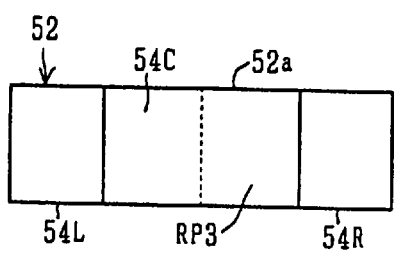
FIG. 15(c) is a bottom view.
Figure 15D:
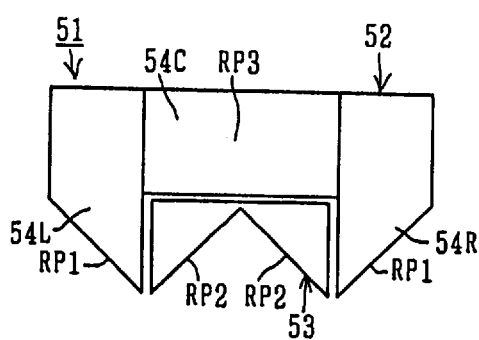
FIG. 15(d) is a back view.

Referring to FIGS. 14 and 15, still another embodiment of the prism unit is shown. A prism unit 51 is constituted by a fixed prism 52 and an upper central prism 53 sliding up or down to totally reflect the light rays three times at 90 degrees similarly to the prism unit 35 shown in FIG. 9.

The fixed prism 52 is formed in a shape that trapezoidal 90-degree reflection prism units 54R and 54L connected symmetrically to the right and left sides of a central lower 90-degree reflection prism 54C. The central prism 53 is a front surface M shape prism connected with 90-degree reflecting prisms in parallel. The central prism 53 is inserted to the upper gas of right and left trapezoidal 90-degree reflection prism units 54R and 54L of the right and left of the fixed prism 52 to be vertically slid up and down.

As shown in FIG. 14, inner one-half images of right and left focal plates 55R and 55L are incident to the lower surfaces of right and left trapezoidal 90-degree reflection prisms 54R and 54L of the fixed prism 52 installed on the focal plates 55R and 55L to totally reflect three times by reflecting surfaces RP1, RP2 and RP3, and an erected image synthesized to one picture by the pictures of right and left one-half pictures of the vertical plane of projection 52a of the central lower parts.

Referring to FIG. 16, a slide mechanism of the central prism 53 is shown. The central prism 53 is mounted at the slide guide 56, and urged by a compression spring 57. Similarly to the prism slide mechanism shown in FIG. 11, a prism moving cam 59 is provided coaxially with the focus/ inter-optical axis distance adjusting cam (not shown) is provided at a cam shaft 58, and the prism moving cam 59 is coupled to the upper central prism 53 via a lever 60 and a tappet rod 61.

Figure 17:
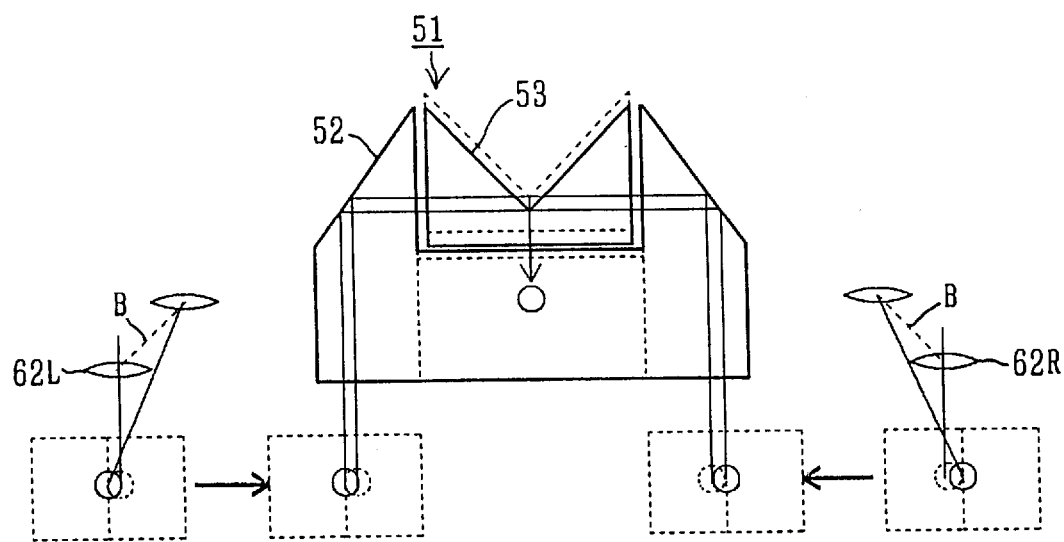
FIG. 17 is an explanatory view for explaining a relationship between the prism unit of FIG. 14 and the finder picture.

The central prism 53 is slid in a direction upward or downward with respect to the back and forth movement of the photographing lenses by the rotating operation of the knob of the inter-optical axis distance/focus adjusting mechanism. As shown in FIG. 17, the central prism 53 is moved between the lower end position of the case that the photographing lenses 63R and 62L are advanced to the shortest photographing distance to the raised position at the time of photographing at an infinite remote distance. The image of the subject at a focal distance on the extension line passing the center of the stereo camera is brought into agreement with the vertexes of the centers intersecting the right and left 90-degree reflecting prism units of the upper central prism 53 respective of the positions of the lenses, and as observed as shown in FIG. 19(b), and if the focus is displaced, it is observed as in FIGS. 19(c) and 19(d), and the focus can be adjusted due to the positional deviation of the finder image.

Figure 18:
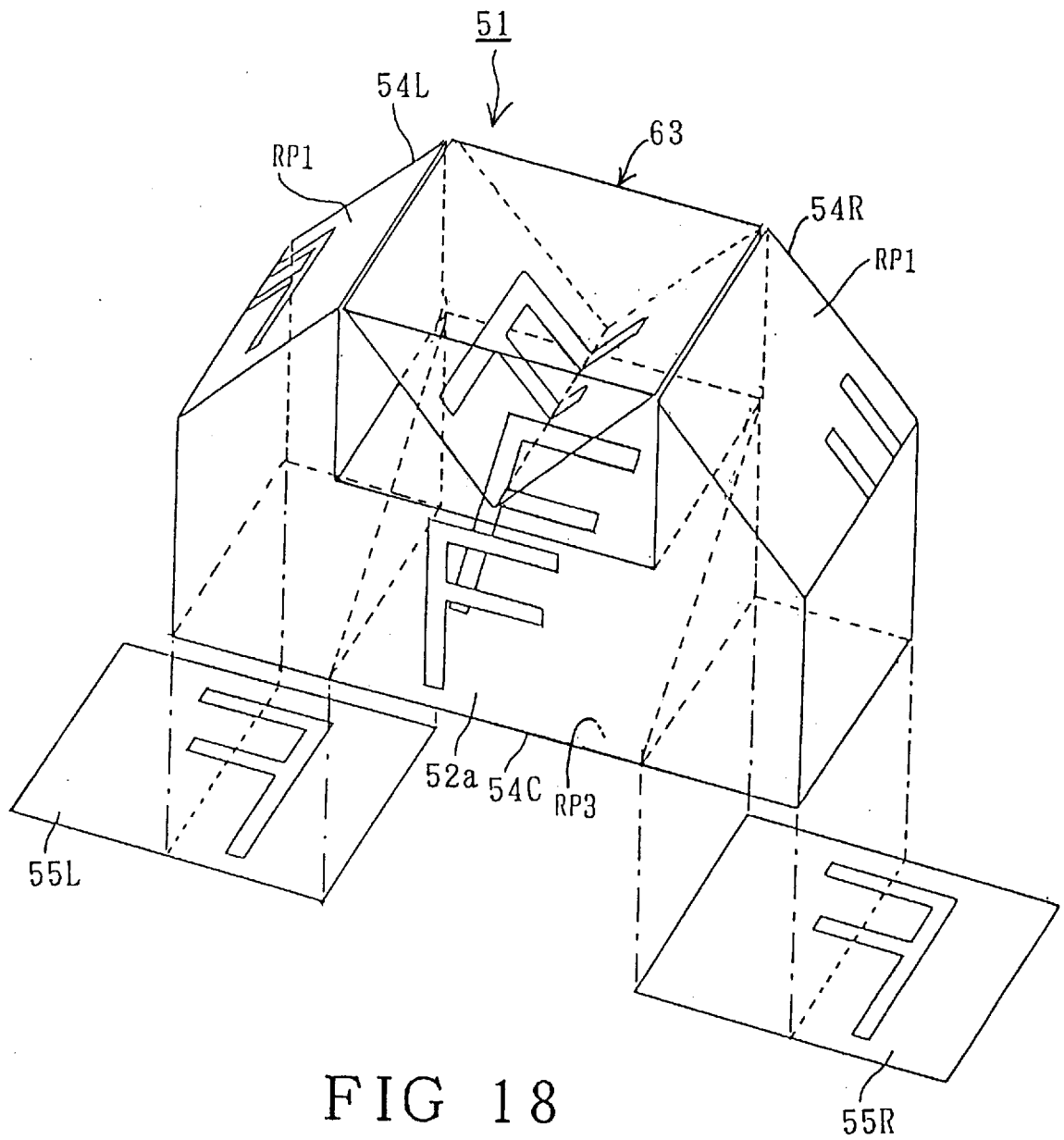
FIG. 18 is a perspective view illustrating still another embodiment of the prism unit.

Referring to FIG. 18, a triangular mirror 63 having the same operation as the upper central prism 53 is disposed instead of the upper central prism 53 of the prism unit 51 shown in FIG. 14. The mirror 63 is moved upward or downward by interlocking to the inter-optical axis distance/focus adjustment by the slide mechanism shown in FIG. 16, and the focus is adjusted by the positional deviation of the finder image similarly to that shown in FIG. 17.

In the stereo camera of the present invention as described above, the prism for synthesizing the one finder image by the outer one-half portions of the right and left photographing pictures is moved interlocking to the inter-optical axis distance/focus adjusting mechanism for automatically correcting the collimation, and the subject at the focal distance is disposed at the center of the right and left finder images at the intermediate of the optical axes of the right and left photographing lenses at all times. Accordingly, the subject at the focal distance can be focused according to the state of the subject image by observing the real state by the finder picture irrespective of the setting of the inter-optical distance correcting amount with respect to the focal distance. Therefore, the stereo camera having high performance and excellent operability that the difficulty of incompleteness of the collimation correction and the focusing of the disadvantages of the conventional stereo camera can be provided.

The present invention is in no way limited to the above-mentioned embodiments only but can be modified in a variety of ways without the technical scope of the invention.

What is claimed is:

1. A stereo camera having two optical systems of a single-lens reflex camera disposed in parallel on one camera body, comprising:
   a right photographing lens;
   a left photographing lens;
   a prism finder for synthesizing one picture by combining outer one-half portions of photographing fields of said right and left photographing lenses,
   an inter-optical axis distance/focus adjusting mechanism for obliquely moving said right and left photographing lenses along a line connecting an infinite remote focal position to a shortest distance focal position at an inter-optical axis distance,
   a prism moving mechanism, wherein said prism is slidably mounted for approaching and separating right and left one-half portions of a finder image,
   an interlocking mechanism for interlocking said prism moving mechanism to said inter-optical axis distance/focus adjusting mechanism, so that said inter-optical axis distance/focus adjusting mechanism is so constituted that a focal distance point on a line in parallel with two right and left optical axis is positioned at the center of right and left pictures formed by said prism finder at all times.

2. A stereo camera comprising:
   a first photographing lens having a first optical axis;
   a second photographing lens having a second optical axis;
   inter-optical axis distance/focus adjusting means, coupled to said first photographing lens and said second photographing lens, for simultaneously varying a distance between the first and second optical axis and a focus of said first and second photographing lenses;
   a finder for synthesizing a picture composed substantially of outer one-half portions of photographing fields of said first and second photographing lenses; and
   finder adjusting means, coupled to said inter-optical axis distance/focus adjusting means and said finder, for moving an image of the outer one-half portions of the photographing fields of said first and second photographing lenses with movement of said inter-optical axis distance/focus adjusting means,
   whereby the stereo camera can be focused on a selected subject for improved stereo effect.

3. A stereo camera as in claim 2 wherein:
   said finder comprises a plurality of prisms.

4. A stereo camera as in claim 3 further comprising:
   a mirror positioned to reflect light incident to said plurality of prisms.

5. A stereo camera as in claim 2 wherein:
   said finder adjusting means comprises a cam positioned to move said finder.

6. A stereo camera as in claim 2 wherein:
   said inter-optical axis distance/focus adjusting means comprises a cam positioned to move said first and second photographing lenses.

7. A stereo camera providing stereoscopic imaging comprising:
   a first photographing lens having a first optical axis;
   a second photographing lens having a second optical axis;
   an inter-optical axis distance/focus mechanism coupled to said first photographing lens and said second photographing lens, whereby a distance between the first and second optical axis and a focus of said first and second photographing lenses may be varied;
   a prism finder, said prism finder synthesizing a picture composed substantially of outer one-half portions of photographing fields imaged by said first and second photographing lenses; and
   a prism finder moving mechanism coupled to said prism finder and said inter-optical axis distance/focus mechanism, whereby said prism finder is moved when said first and second photographing lenses are moved by said inter-optical axis distance/focus mechanism,
   whereby the stereo camera can be focused on a selected subject for stereo effect.

8. A stereo camera as in claim 7 wherein said prism finder moving mechanism comprises:
   a slide guide mounted on said prism finder;
   a prism moving cam coupled to said inter-optical axis distance/focus mechanism; and
   a lever placed between said slide guide and said prism moving cam.

9. A stereo camera as in claim 8 further comprising:
   a spring biasing said slide guide against said lever.

10. A stereo camera comprising:
    a camera body;
    a first lens board movably mounted on said camera body;
    a first photographing lens mounted in said first lens board;
    a second lens board movably mounted on said camera body;

a second photographing lens mounted in said second lens board;

a first guide arm attached to said first lens board;

a second guide arm attached to said second lens board;

a central slide guide positioned between said first and second photographing lenses;

a finder prism mounted on said central slide guide, said finder prism forming a composite image from a first outer one-half portion of a first image formed by said first photographing lens and a second outer one-half portion of a second image formed by said second photographing lens;

a prism guide arm mounted on said prism;

a cam shaft extending within said camera body;

a first involute cam mounted on said cam shaft and engaging said first guide arm;

a second involute cam mounted on said cam shaft and engaging said second guide arm;

a prism moving cam mounted on said cam shaft intermediate said first involute cam and said second involute cam and engaging said prism guide arm, wherein when said cam shaft is moved the first and second photographing lenses and the prism finder are coupled and are moved together resulting in an ability to compose stereo photographs.

11. A stereo camera as in claim 10 further comprising:

a first reflex mirror positioned to reflect light incident to one side of said prism finder; and a second reflex mirror positioned to reflect light incident to another side of said prism finder.

* * * * *